Patented July 11, 1950

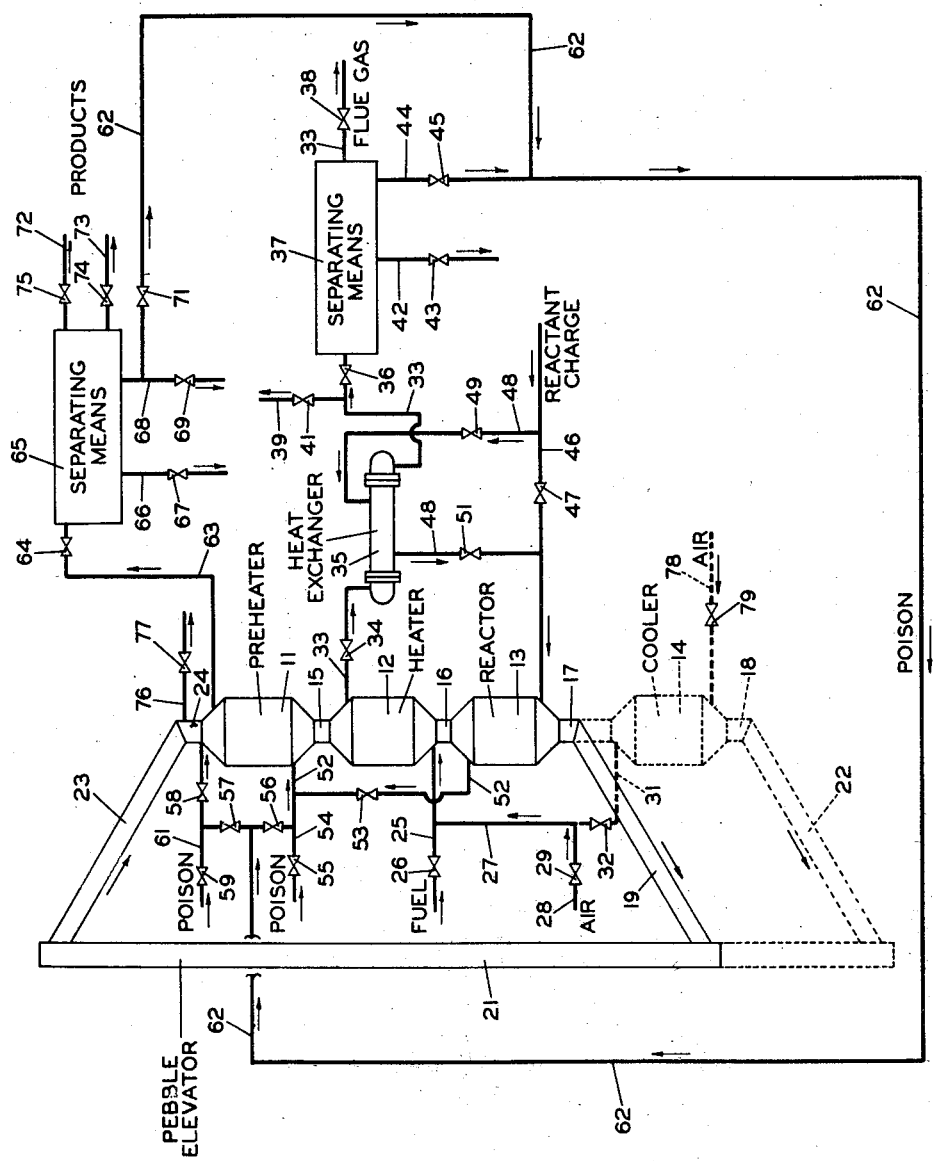

2,514,497

UNITED STATES PATENT OFFICE 2,514,497

CHEMICAL CONVERSION PROCESS

Jean P. Jones, Bartlesville, Okla., assignor to Phillips Petroleum Company, a corporation of Delaware Application December 15, 1947, Serial No. 791,918

8 Claims. (Cl. 196—55)

This invention relates to conversion processes effected in pebble heater type apparatus. A specific aspect of the invention pertains to a method of preventing deleterious side reactions in the effluent gas from the reaction zone of a pebble heater apparatus during the step of preheating the pebble stream by contacting the same with the effluent. Another aspect of the invention pertains to the quenching of hot gaseous reaction zone effluent by contact with a moving bed of cooler pebbles.

Pebble heater type apparatus is finding increasing favor in effecting chemical reactions continuously at temperatures of the order of 1500 to 3500° F., and in some cases, even as high as 4000° F. It has been found that pebble heater apparatus is particularly well adapted to effecting chemical reactions at exceedingly high temperatures and short reaction times. Factors favoring the utility of the pebble heater are the extremely sharp heating rates made possible by this type of apparatus and the avoidance of contamination of the products of the reaction with combustion gas. The effluents from these high temperature reactions are at correspondingly high temperatures and in order to make the process more efficient and economical, it is desirable, in most cases, to recover some of the sensible heat of the effluent. One method of recovering heat from the effluent gases is to contact the recycled pebbles before they are introduced to the pebble heating zone proper, thereby preheating the pebbles a substantial amount and, of course, recovering a large portion of the sensible heat of the gases. Such preheating, however, prolongs the time of contact between desirable reaction products and pebbles and, consequently, in effecting chemical reactions which require high temperatures and short reaction times, this step of preheating the pebbles with effluents from the reaction zone carries the reaction too far and/or effects decomposition of desirable product or undesirable side reactions between constituents of the reaction zone effluent. The conventional method of stopping reaction and preventing undesirable side reactions is by rapidly quenching the effluents with water or other quenching fluid. However, this method is not particularly desirable if sensible heat of the product gases is to be returned to the pebble stream for use in the reaction zone.

The term pebble as used throughout this specification denotes any solid refractory material of flowable form and size which can be used to carry heat from one chamber or zone to another. Substantially spherical pebbles of about ⅛ inch to ¾ inch in diameter can be used in most instances but the preferred size for most processes lies between ¼ inch and ½ inch. Pebbles of alumina, beryllia, magnesia, thoria, zirconia, mullite, periclase, and other refractory ceramic materials are suitable for various pebble heater processes.

In pebble heater operation at temperatures above 1500° F., it is necessary to select pebbles which will withstand the extremely high temperature and shock conditions of temperature change, impact, and abrasion to which they are subjected in the apparatus. Hard, dense, glazed pebbles compacted from relatively pure alumina and fired at about 3000° F. stand up well over long periods in pebble heater operation. Pebbles compacted from mullite and given a similar treatment are also found to be serviceable over long periods. The inclusion of the usual catalytic materials in pebbles is found to be ineffective in producing the desired result, since these catalysts suffer extreme degradation and becomes relatively inactive under the conditions of operation, as well as contributing to the breakdown of the pebbles themselves. While the pebbles found most satisfacory for long time service in a pebble heater unit are relatively non-catalytic at normal temperatures for a given reaction, in many cases, they are found to exert some catalytic influence at the extremely high temperatures existing in the reaction zone and in the pebble preheating zone. In some processes, they accumulate carbon and/or metal particles, such as iron, during passage through the system from carbon lay down in the reaction zone and from abrasion in the pebble elevator. These substances, either alone or in admixture, deposited on the surface of the pebbles, in some reactions tend to catalyze undesirable side reactions or degradation reactions in the preheater. It is with prevention of such reactions in the pebble preheating zone that this invention is concerned.

The principal object of this invention is to recover sensible heat contained in effluents of a pebble heater reactor in the flowing pebble stream without unduly subjecting these effluents to overreaction or degradation reactions. Another object of the invention is to extract sensible heat from a high temperature gaseous material containing unsaturated hydrocarbons while minimizing catalytic polymerization or other catalytic reactions of these unsaturated hydrocarbons. Another object of the invention is to quench a stream of hot gas without prolonging reaction of constituents therein and with recovery of sensible heat therefrom. Further objects of the invention will be evident from the accompanying drawing and disclosure.

The present invention provides for the introduction of a catalytic poison into the pebble preheating zone together with the effluent from the reaction zone of a pebble heater plant. This introduction of a poison into the preheating zone reduces or eliminates any catalytic effect that the pebbles have toward the further reaction of products which are constituents of the effluent. The term "catalyst poison" as used throughout the specification is intended to include within its scope any of the well known catalyst poisons as well as substances termed "catalyst inhibitors." The term is intended to include any substance which reduces or eliminates the catalytic activity of a given catalyst for a given reaction. Effective poisons which reduce or eliminate the activity of specific catalysts in specific reactions are quite well known and no attempt is made to list all of the known catalyst poisons. A few of the more commonly recognized catalyst poisons include, lead, copper, and manganese cyanides and arsenates, mercury vapor, and salts of mercury. The hydrides and volatile compounds of phosphorous, selenium, and tellurium are effective as catalyst poisons with respect to metal catalysts, particularly iron, in hydrocarbon conversion reactions, such as cracking and dehydrogenation. Steam, alcohols, and other organic compounds function as poisons in certain reactions on specific catalysts for those reactions.

The invention has wide utility in hydrocarbon conversion reactions which are advantageously performed in pebble heater apparatus at extremely high temperature and short reaction time with necessity for a rapid quench in order to stop the reaction and prevent side reactions. Various dehydrogenation and cracking reactions involving hydrocarbons are performed to advantage with increased yield according to the invention. However, the invention is highly advantageous when applied to any chemical process which produces an effluent containing materials reactive in the presence of refractory heat-transfer pebbles under the conditions existing in a pebble quenching chamber. Illustrative of other processes to which the invention is applicable are the synthesis of HCN from low molecular weight hydrocarbons and $NH_3$ and the synthesis of $CS_2$ from sulfur-bearing gases and low molecular weight hydrocarbons. In both of these syntheses short reaction time at high temperature followed by a fast quench are conducive to high yields and the elimination of the catalytic effect of the pebbles when using a moving stream of pebbles as a quenching means is critical.

Since this invention is particularly concerned with hydrocarbon conversion reactions such as the conversion of saturated to unsaturated hydrocarbons, suitable catalyst poisons for those reactions are paramount. As stated hereinbefore, pebbles for high temperature reactions exhibit little, if any, catalytic activity in the initial stages of the process, but due to accumulation of metal, carbon, etc., during use, they gradually become relatively strong catalysts for promoting polymerization, degradation reactions, etc., when the reaction effluent is subjected to further contact with the pebbles at high temperature which, of course, occurs in the lower portion of the preheating chamber. Particularly effective in reducing catalytic activity of the pebbles in the preheating zone when converting hydrocarbons to less saturated hydrocarbons are various sulfur compounds, including hydrogen sulfide, gaseous mercaptans, and other organic sulfur compounds and various metal sulfides. Volatile arsenic compounds such as arsine or alkyl arsines, tin alkyls, silicon alkyls (silicanes) function suitably in this application of the invention. Zinc oxide is found to considerably dampen the catalytic effect of pebbles in the pebble preheater during conversion of hydrocarbons to less saturated hydrocarbons. Any substance which dampens the catalytic effect of the pebbles in the preheater and which is volatile at the temperatures existing in the hottest part of the preheating zone is included within the scope of the invention.

The catalyst poison may be introduced in gaseous form into the lower part of the preheater either with the effluent from the reaction zone or independently thereof. When introducing a volatile solid or liquid material as a catalyst poison, it is preferred to introduce it into the top of the preheater with the pebbles. In most instances, the catalyst poison will pass off with the effluent from the preheating zone and can be recovered and recycled to the system. Any portion of the catalyst poison that passed into the pebble heating zone with the pebbles will pass off with the combustion gas from that zone and can be recovered therefrom, if desired.

Most catalyst poisons are quite effective in amounts as low as 0.001 per cent by weight of the effluent gas passing through the preheater and are not required in amounts greater than about 1 per cent. It is realized that the most direct method of measuring the amount of catalyst poison required is comparing the amount of poison with the amount of catalyst present in the pebble heating chamber. However, it has been found to be more feasible to regulate the amount of poison admitted to the preheater in relation to the amount of effluent passed through the preheater. Since the amount of effluent passed through the preheater is proportional to the amount of pebbles passing therethrough, the former is obviously an accurate criterion of the amount of poison required. The amount of poison required in any specific reaction under any given set of conditions can readily be determined by experiment.

One advantage of the invention not heretofore pointed out, is in the reduction of carbon formation on the pebbles. In hydrocarbon conversion reactions, it is obvious that reduction of degradation reactions will prevent excessive carbon deposition. It has been found that when carbon deposition is heavy, the pebbles are much more subject to breakage due to carbon formation in the pores and minute cracks of the pebbles and that when catalyst poisons are used in the pebble preheating zone when effecting such reactions, pebble breakage is substantially reduced.

The invention is also applicable to the quenching of a hot effluent from a high temperature furnace when such an effluent contains reaction products which are reactive with each other or which suffer degradation reactions when maintained at high temperature in contact with pebbles used for quenching. In some processes, such as that disclosed in application, Serial No. 767,300, a reaction is effected in a high temperature furnace and the effluent is quenched by passing the same through a descending bed of pebbles in a quenching chamber and the hot pebbles then pass downwardly into another chamber which is utilized for preheating the reactants to the high temperature furnace. Thus, it is seen that the invention is applicable to the quenching of any high temperature product stream with a moving bed of pebbles which have any catalytic activity with respect to the products.

In another modification of the invention, the effluent from the reaction zone is given a fast liquid, partial quench to bring the products down to a temperature which minimizes reaction outside the influence of a catalyst and then passing the effluent stream through a pebble quenching chamber with added catalyst poison to prevent reaction of the constituents of the effluent stream. This application of the invention is advantageous in recovering a considerable portion of the heat of the effluents where an instantaneous partial quench is desirable. An application of this modification of the invention is in the production of ethylene or acetylene from more saturated hydrocarbons at temperatures around 2500° F. and higher, but it is within the scope of the invention to utilize a partial quench between the reaction zone and the pebble quenching zone in other processes.

The drawing is a diagrammatic representation of one arrangement of apparatus particularly suitable for practicing the invention.

The apparatus in the drawing includes a series of pebble chambers arranged in vertical alignment including preheater 11, heater 12, and reactor 13. In some installations, it is desirable to utilize a fourth chamber such as cooling chamber 14 for cooling the pebbles before they are elevated and preheating one or more of the reactants, air, or fuel for the combustion zone of heater 12. Throats 15, 16, and 17 may be made up of one or more relatively narrow restricted passageways between the chambers and serve to pass pebbles from chamber to chamber and simultaneously restrict the flow of gases therebetween. Elements 17 or 18 are outlet conduits from the bottom chamber connecting with chutes 19 or 22, respectively, which feed pebbles into elevator 21. Elevator 21 transfers pebbles to chute 23 for delivery into preheater 11 through inlet 24. Pebble chambers 11, 12, 13, and 14 are steel casings lined with refractory material with super-refractory material being used in the hottest zones of the system. Likewise, pebble passageways between chambers are refractory lined in order to protect the shell and retain heat within the system.

In operation of the apparatus shown, a suitable fuel is introduced to a combustion zone in the lower part of heater 12 by means of line 25, controlled by valve 26, in admixture with air from line 27 and line 28 controlled by valve 29, or alternatively, from line 31 controlled by valve 32, if the air is to be preheated in chamber 14. Hot combustion gas passing upwardly through heater 12 imparts heat to a downwardly flowing solid, contiguous stream of pebbles therein and is taken off through line 33 controlled by valve 34, which passes the combustion gas through heat exchanger 35 in heat exchange relation with the feed to the process. The combustion gas coming out of heat exchanger 35, including variable amounts of catalyst poison vaporized from the pebbles in the heater, is usually passed through valve 36 into separating means 37 for separation of catalyst poisons entrained therein, which may be taken off through line 44 controlled by valve 45 and recycled to the system through line 62, if desired. The combustion gas is taken off through line 33 and valve 38. Where the recovery of catalyst poison is not economically feasible, the combustion gas egressing from heat exchanger 35 may be vented through line 39 controlled by valve 41. Any other material, such as water, separated from the heater effluent in means 37 may be taken off through line 42 and valve 43.

Hot pebbles passing through throat 16 are contacted in reactor 13 with a reactant charge introduced into the lower portion of the reactor through line 46, either directly through valve 47 or through line 48, controlled by valves 49 and 51, which circulates the feed or charge through heat exchanger 35 in order to preheat the same. The effluent from reactor 13 containing reaction products and unreacted feed passes through line 52, under the control of valve 53, into the lower portion of preheater 11 and into contact with a descending stream of pebbles introduced into the upper part of the chamber. Catalyst poison is introduced along with the feed through line 54 controlled by valve 55, or through line 61 into the upper portion of preheater 11 by controlling valves 59 and 58. When catalyst poison is recycled from separation means through line 62, it is passed either to line 54 or line 61 by operating valves 56 or 57.

The contact of the reactor effluent with cool pebbles descending through preheater 11 in the presence of a catalyst poison introduced either into the lower or upper portion of the preheater exchanges heat between the hot effluent and the cool pebbles without unduly degrading the constituents of the effluent. Quenched effluents from preheater 11 pass through line 63 and valve 64 to separating means 65 for separation into various streams of constituents which may be removed separately through lines 66, 68, 72, and 73, controlled by valves 67, 69, 75, and 74, respectively. Line 68 is utilized for removing separated catalyst poison and can be recovered directly through valve 69 or passed through line 62, by controlling valve 71, for return to the pebble preheater 11.

In instances where it is desired to deposit the catalyst poison on the pebble stream in inlet 24 by means of a suitable carrier gas for the poison, valve 77 in line 76 can be operated to remove the carrier gas and any entrained catalyst poison. Line 78 controlled by valve 79 is utilized in conjunction with pebble cooler 14 when it is desired to preheat the air admixed with fuel for combustion in heater 12 and/or when it is desired to cool pebbles leaving reactor 13 sufficiently to permit the use of less expensive elevator equipment such as ordinary cast iron.

In effecting hydrocarbon conversion reactions in pebble heater apparatus the most effective temperatures lie in the range of about 1500° to 3000° F. In order to maintain such temperatures in the reaction chamber, pebble inlet temperatures must range from about 1650° to 3200° F. and it is sometimes advantageous to operate with a differential of 400° or 500° F. between reaction temperature and pebble inlet temperature. In processes involving other reactions the most suitable reaction temperature varies from about 1500° to 3500° F., depending upon the particular reaction and the reaction time utilized. Pebble inlet temperatures required must necessarily be correspondingly higher.

The following examples are believed to clearly illustrate particularly advantageous adaptations of the present invention.

*Example I*

A feed stream comprising about 90 per cent by volume of ethane, 5 per cent propane and 5 per cent methane is preheated to about 800° F. and passed through a pebble heater reactor in countercurrent contact with a descending mass of ⅜ inch alumina pebbles at an initial temperature of 1850° F. Flow of feed and pebbles are correlated so that the gaseous effluent leaves the reactor at a temperature of about 1650° F. The hot effluent is passed from the reactor to a product quenching-pebble preheating chamber in which the products are cooled to about 800° F. by countercurrent contact with descending pebbles. A stream of hydrogen sulfide gas in the amount of approximately 0.1 per cent by weight of the effluent is continuously injected into the hot product stream just prior to its entry into the product quenching zone. Products withdrawn from this zone are further cooled by conventional heat exchange, and passed to separation and recovery steps.

When operating in this manner, it is found that carbon deposition on and within the pebbles is lessened materially in comparison with that encountered when no catalyst poison is employed. Furthermore, it is found that the yield of ethylene is increased and that of heavier products (partially resulting from polymerization reactions during the quenching period) is decreased. The following tabulation is illustrative of benefits derived from the use of $H_2S$ in the preheater. (Figures are based on weight per cent of ethane reacted.)

|  | Without $H_2S$ | With $H_2S$ |
| --- | --- | --- |
| Ethylene Yield | 60.0 | 64.8 |
| Carbon deposited | 5.0 | 2.1 |
| Heavy Products other than carbon | 4.6 | 2.3 |

Example II

A feed stream comprising 95 per cent ethylene and 5 per cent ethane by volume is preheated to about 800° F. and passed through a pebble heater reactor in countercurrent contact with a descending mass of ⅜ inch alumina pebbles at an initial temperature of 2500° F. Flow rates are correlated so that a contact time of about 0.02 sec. is maintained in the reaction zone and the products leave the reactor at a temperature of about 2000° F. The hot effluent is passed to a product quenching-pebble preheating zone where it is cooled to about 800° F. by countercurrent contact with descending pebbles. Adjacent the point at which the pebbles enter the top of the pebble preheating zone, powdered zinc oxide in the amount of approximately 0.01 per cent by weight based on the effluent is introduced into the pebble stream. It is found that the zinc oxide reduces the tendency of the reaction products to undergo further reactions during the quenching period leading to the formation of free carbon, aromatic hydrocarbons, and heavy tars. Thus, the yield of acetylene is materially increased.

The following tabulation illustrates the effect of the zinc oxide used according to the invention when converting ethylene to acetylene. (Figures are based on weight per cent of ethylene converted.)

|  | Without ZnO | With ZnO |
| --- | --- | --- |
|  | Per cent | Per cent |
| Yield of $C_2H_2$ | 60 | 70 |
| Free Carbon | 5 | 3 |
| Heavy products other than carbon | 10 | 5 |

The above examples clearly illustrate advantages to be gained from operation in accordance with the invention. However, the examples are only illustrative and must not be construed as unduly limiting the invention. Numerous modifications and applications of the invention are permissible within the scope thereof, which is limited only by the scope of the appended claims.

I claim:

1. An improved process for the noncatalytic conversion of a gaseous saturated hydrocarbon to a gaseous unsaturated hydrocarbon, which comprises continuously passing essentially noncatalytic pebbles downwardly through an upper preheating zone, a middle pebble heating zone, and a lower hydrocarbon conversion zone; heating said pebbles in said heating zone to between about 1650 and 3200° F. by contact with combustion gases; directly and countercurrently contacting in said conversion zone said hot pebbles with a stream of a gaseous saturated hydrocarbon material at correlated flow rates such that said hydrocarbon material is heated by heat contained in said pebbles to a temperature within the range of 1500 to 3000° F. and converted to an unsaturated hydrocarbon with a deposition of carbonaceous material on said pebbles as a result of side reactions, said carbonaceous material having catalytic properties for the conversion of unsaturated hydrocarbons; removing resulting cool carbonaceous pebbles from the lower portion of said conversion zone and a resulting hot unsaturated hydrocarbon material from the upper portion of said conversion zone, passing said cool pebbles to the top of said upper preheating zone; passing said hot unsaturated hydrocarbon material to the lower part of said upper preheating zone in countercurrent contact with said cool carbonaceous pebbles to preheat same with the heat content of said hydrocarbon material, and introducing into said hot hydrocarbon material between 0.001 and 0.5 per cent by volume of hydrogen sulfide to inhibit the catalytic action of said carbonaceous deposit.

2. An improved process for the noncatalytic conversion of a hydrocarbon material, which comprises continuously passing essentially noncatalytic pebbles downwardly through an upper preheating zone, a middle pebble heating zone, and a lower hydrocarbon conversion zone; heating said pebbles in said heating zone to between about 1650 and 3200° F. by contact with combustion gases; directly and countercurrently contacting said hot pebbles with a stream of a hydrocarbon material at correlated flow rates such that said hydrocarbon material is heated by heat contained in said pebbles to a temperature within the range of 1500 to 3000° F. and undergoes conversion with a deposition of carbonaceous material on said pebbles as a result of side reactions, said carbonaceous material having catalytic properties for the conversion of hydrocarbons; removing resulting cool carbonaceous pebbles from the lower portion of said conversion zone and a resulting hot unsaturated hydrocarbon material from the upper portion of said conversion zone; passing said cool pebbles to the top of said upper preheating zone; passing said hot hydrocarbon material to the lower part of said upper preheating zone in countercurrent contact with said cool carbonaceous pebbles to preheat same with the heat content of said hydrocarbon material; and introducing into said hot hydrocarbon material between 0.001 and 1 per cent by volume of a volatizable catalyst poison to inhibit the catalytic action of said carbonaceous deposit.

3. In a process for effecting conversion of hydrocarbons in gas phase at elevated temperatures which comprises continuously passing refractory pebbles through a series of heat exchange zones comprising from upper to lower a pebble preheating zone, a pebble heating zone, and a conversion zone; contacting said pebbles in said pebble heating zone with hot combustion gas so as to heat said pebbles to a temperature above an effective conversion temperature; contacting said pebbles in said conversion zone with a stream of the hydrocarbon to be converted under conversion conditions so as to effect conversion of said gas; contacting said pebbles in said preheating zone with a stream of hot effluent from said conversion zone so as to recover sensible heat from said effluent; in which process said pebbles are catalytic with respect to at least one desired product of the conversion so as to effect undesirable conversion thereof under the conditions prevailing in said pebble preheating zone; the improvement which comprises introducing into said pebble preheating zone a catalyst poison in an amount sufficient to substantially retard the catalytic effect of said pebbles under the conditions prevailing therein.

4. A process for cracking hydrocarbons in gas phase at elevated temperature which comprises continuously passing refractory pebbles through a series of heat exchange zones comprising from highest to lowest a pebble preheating zone, a pebble heating zone, and a conversion zone; contacting said pebbles in said pebble heating zone with hot combustion gas so as to heat said pebbles to a temperature between about 1650° and 3200° F., contacting said pebbles in said cracking zone with a stream of the hydrocarbon to be cracked so as to heat said hydrocarbon to a cracking temperature in the range of about 1500° and 3000° F. and thereby crack the same; contacting said pebbles in said preheating zone with a stream of hot effluent from said cracking zone so as to recover sensible heat from said effluent; simultaneously introducing into said pebble preheating zone a catalyst poison in an amount sufficient to substantially retard the catalytic effect of said pebbles under the conditions prevailing therein; and recovering a hydrocarbon product from said effluent.

5. The process of claim 4 in which the pebbles are $\frac{3}{16}$ inch to $\frac{5}{8}$ inch alumina spheres and zinc oxide in an amount ranging from 0.001 to 1 per cent by weight based on said effluent is introduced into the upper part of the pebble preheating zone.

6. The process of claim 4 in which the pebbles are $\frac{3}{16}$ inch to $\frac{5}{8}$ inch alumina spheres and hydrogen sulfide gas in an amount ranging from 0.001 per cent to 1 per cent by volume based on said effluent is introduced to said preheating chamber with said effluent.

7. In a method of quenching a hot gaseous hydrocarbon stream comprising passing said stream upwardly through a confined zone in intimate contact with a descending stream of cool pebbles which are catalytic with respect to degradation reactions involving hydrocarbon constituents of said stream under the conditions existing in said zone, the improvement which comprises introducing into said zone in the presence of said stream a catalyst poison in an amount effective in reducing the catalytic effect of said pebbles under the conditions existing in said zone.

8. The process of claim 7 in which said pebbles comprise alumina impregnated with carbon, and said catalyst poison is hydrogen sulfide.

JEAN P. JONES.

REFERENCES CITED

The following references are of record in the file of this patent:

UNITED STATES PATENTS

| Number | Name | Date |
|---|---|---|
| 2,129,693 | Houdry | Sept. 13, 1938 |
| 2,168,840 | Groll | Aug. 8, 1939 |
| 2,194,335 | Tropsch | Mar. 19, 1940 |
| 2,389,636 | Ramseyer | Nov. 27, 1945 |